(No Model.) 2 Sheets—Sheet 1.
V. MERKLEN.
LATHE FOR TURNING WOODEN SPIRALS.
No. 390,884. Patented Oct. 9, 1888.
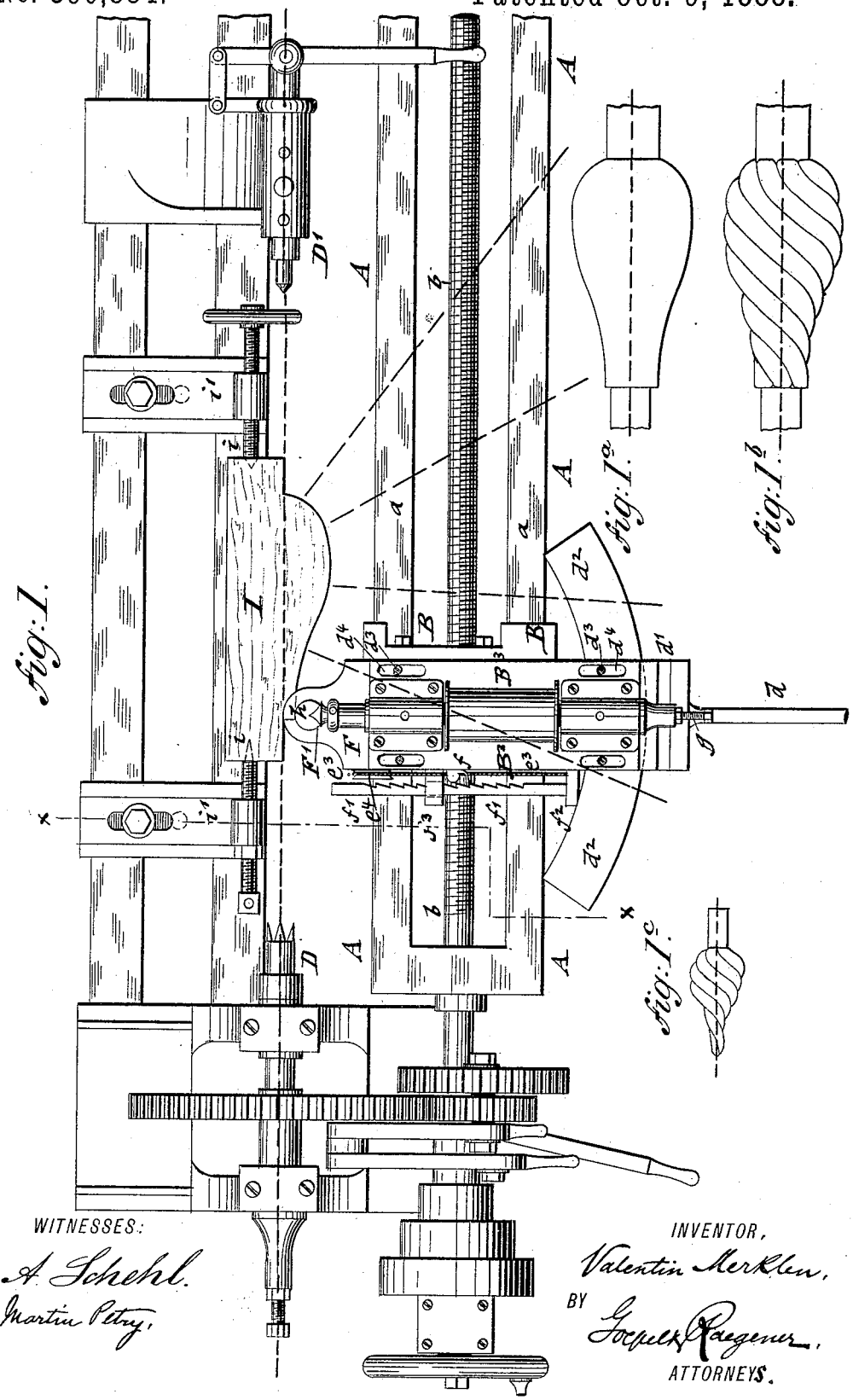
WITNESSES:
A. Schehl.
Martin Petry.
INVENTOR,
Valentin Merklen,
BY
Joepel & Raegener,
ATTORNEYS.

(No Model.) 2 Sheets—Sheet 2.
V. MERKLEN.
LATHE FOR TURNING WOODEN SPIRALS.
No. 390,884. Patented Oct. 9, 1888.
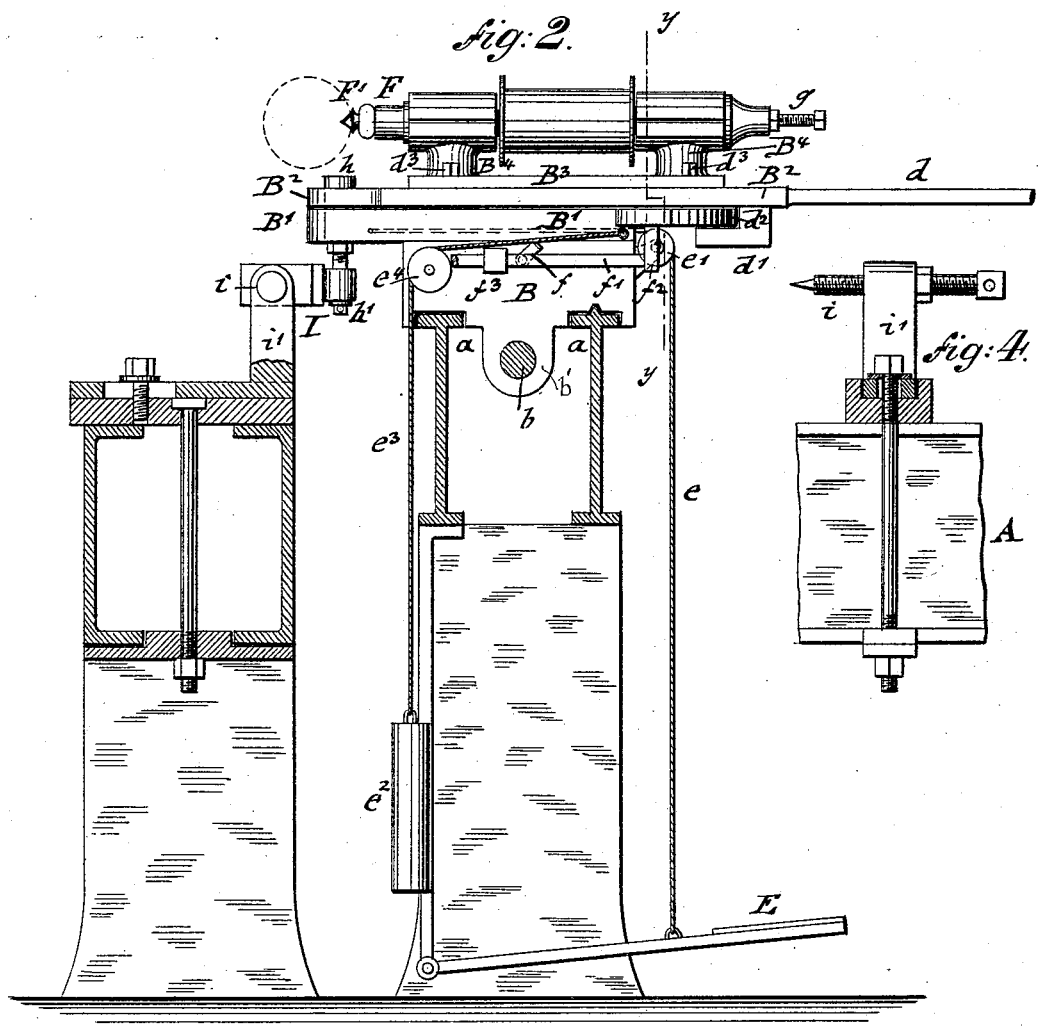
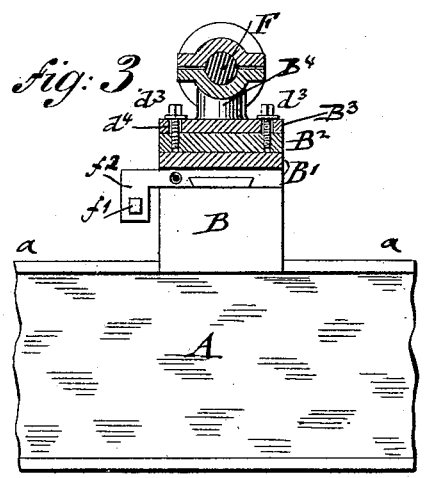
WITNESSES:
A. Schehl.
Martin Petry.
INVENTOR,
Valentin Merklen.
BY
Goepel & Raegener
ATTORNEYS.

UNITED STATES PATENT OFFICE.

VALENTIN MERKLEN, OF NEW YORK, N. Y.

LATHE FOR TURNING WOODEN SPIRALS.

SPECIFICATION forming part of Letters Patent No. 390,884, dated October 9, 1888.

Application filed November 28, 1887. Serial No. 256,285. (No model.)

*To all whom it may concern:*

Be it known that I, VALENTIN MERKLEN, of the city, county, and State of New York, have invented certain new and useful Improvements in Lathes for Turning Wooden Spirals, of which the following is a specification.

This invention relates to an improved lathe for turning wooden spirals of different shapes from wooden blocks, to be used for the legs of tables and chairs, newel-posts, balusters, and the like, the invention being an improvement on the lathe for turning spirals for which Letters Patent were granted to me, No. 245,740, dated August 16, 1881, and reissued No. 10,765, dated September 21, 1886, so that the same can be used for turning spirals in bodies of tapering shape; and the invention consists of a lathe for turning spirals, which comprises a reciprocating carriage, a slide-rest supported upon and reciprocating in a line transversely to said carriage, and an oscillating arbor-frame supported upon said slide-rest, said oscillatory reciprocating frame supporting a rotary shaft and cutter-head. The oscillating arbor-frame is pivoted to the slide-rest and guided in arc-shaped ways of the same, and provided with a handle and keeper for being guided on said ways, so that the rotary cutter-shaft can be moved with the arbor-frame to a position at right angles to the curvature of the work. The rotary cutter-head can be quickly moved away from the work by a treadle, which is connected by a rope to the slide-rest, said rope passing over a pulley of the carriage and being attached to the slide-rest, while a weight and rope, also attached to the slide-rest, move the same in opposite direction. The slide-rest is locked by means of a pawl and rack when moved away from the work. An anti-friction roller on the lower end of the top pivot of the carriage moves along a pattern-piece that is mounted on centers below the work, said pattern-piece serving to guide the slide-rest, while the rotary and simultaneously-traversing cutter produces the cutting of the spirals in the same.

In the accompanying drawings, Figure 1 represents a plan of my improved lathe for turning wooden spirals. Fig. 1$^a$ is a plainly-turned blank of bulging or tapering shape, and Figs. 1$^b$ and 1$^c$ show differently-shaped tapering bodies with spirals cut in the same. Fig. 2 is a vertical transverse section of the lathe on line $x\ x$, Fig. 1. Fig. 3 is a detail vertical transverse section of the traversing carriage and the slide-rest on line $y\ y$, Fig. 2; and Fig. 4 is a detail vertical section of one of the centers for supporting the pattern-piece.

Similar letters of reference indicate corresponding parts.

In the drawings, A represents the supporting-frame of my improved lathe for turning wooden spirals. The front part of the frame A is provided with longitudinal guideways $a\ a$, on which a longitudinally-traversing carriage, B, is guided. The carriage B receives its traversing motion by a longitudinal screw-rod, $b$, that turns in bearings of the frame A, and passes through a nut, $b'$, at the lower part of the carriage. The screw-rod $b$ receives rotary motion by transmitting gear-wheels and a driving-shaft that is rotated by a suitable belt-and-pulley transmission from a power-shaft overhead. On the rear part of the frame A, back of the carriage, are arranged the lathe-centers D D', of which the lathe-center D receives axially rotary motion by a gear-wheel transmission from said driving-shaft, while the opposite lathe-center, D', is adjustable, the work being supported by the lathe-centers D D' in the usual manner.

On the traversing carriage B is supported a laterally-movable slide-rest, B', that is guided in dovetailed ways of the carriage, and moved toward or away from the work by means of a treadle, E, and a rope, $e$, attached to the slide-rest, said rope passing over a guide-pulley, $e'$, and by a weight, $e^2$, at the end of a rope, $e^3$, which is also attached to the slide-rest and guided over a pulley, $e^4$, as shown clearly in Fig. 2. A stop-pawl, $f$, is pivoted to the carriage B, and serves to engage a fixed rack, $f'$, that extends sidewise along the carriage B, the rack being supported in a keeper, $f^2$, of the slide-rest B', and guided in a second keeper, $f^3$, attached to the carriage, as shown in Fig. 2. The pawl $f$ and rack $f'$ lock the slide-rest B' in position on the carriage B, and prevent the slide-rest from moving toward the work by the action of the weight. For moving the slide-rest in forward direction toward the work the pawl has to be removed from the rack $f'$. To the inner end of the slide-rest B is pivoted an arbor-frame, B², which is provided at the outer end with a handle, $d$, and with a keeper, $d'$, that is guided on an arc-shaped guide-piece, $d^2$, at the outer end of the slide-rest, so as to permit the swinging of the arbor-frame $B^2$ on the pivot of the slide-rest $B'$ through an arc of a circle. To the arbor-frame $B^2$ is applied, by clamp-screws $d^3$, a slotted plate, $B^3$, which carries short standards $B^4$, provided with bearings for the cutter-shaft $F$. To that end of the cutter-shaft next to the work the cutter-head $F'$ is applied. On the cutter-shaft $F$, between the bearings of the standards, is arranged a pulley, around which passes a belt that imparts rotary motion to the cutter-shaft from a power-shaft overhead. The relative position of the cutter-shaft $F$ to the work is adjusted by slots $d^4$ and the clamping-screws $d^3$, while the accurate adjustment of the cutter-head $F'$ is accomplished by a set-screw, $g$, said set-screw bearing on the outer end of the shaft, as shown clearly in Figs. 1 and 2. The pivot $h$ of the top plate, $B^2$, is extended below the slide-rest and provided at the lower end with an anti-friction roller, $h'$. The roller $h'$ is guided along a pattern-piece, I, which is mounted on centers $i$, supported on standards $i'$, said standards being laterally adjustable by means of slots and clamping-screws, as shown in Figs. 1, 2, and 4, so that the centers $i$ and the pattern-piece I, supported thereby, can be adjusted relatively to the work. The pattern-piece I is shaped according to the contour to be given to the work, its axis being located vertically below the axis of the blank to be operated on. The center of the pivot and anti-friction roller is vertically below the point of the cutter-head, so that the latter follows exactly the outline of the pattern-piece I, and cannot cut any deeper than permitted by the shape of the same.

For producing spiral grooves in a blank of bulging or tapering shape it is necessary that the cutter-head, while cutting, should be in a position at right angles, or nearly so, with the contour of the same. For this purpose it is necessary that the cutter-shaft should be held at right angles to the curvature of the blank, as the slide-rest traverses along the profile of the pattern-piece. This is accomplished by taking hold of the handle $d$ and moving the arbor-frame $B^2$ and the cutter-shaft, $F$, supported thereon into the required position, according to the curvature of the work, as indicated in dotted lines in Fig. 1.

The operation of the lathe for cutting spirals is the same as that described in my prior patent referred to, the only difference being that in addition thereto a laterally-swinging motion is imparted to the arbor-frame of the slide-rest, so that the cutter-head can properly perform its cutting action and cut spirals of uniform size into blanks of any desired profile. In this manner the lathe is adapted to produce spiral grooves in blanks of varying diameters, whereby a greater variety of designs can be made than heretofore.

Having thus described my invention, I claim as new and desire to secure by Letters Patent—

1. The combination, with a reciprocating carriage, of a slide-rest supported upon and reciprocating in a line transverse to the movement of the supporting-carriage, and an oscillating arbor-frame pivotally supported upon said slide-rest, substantially as shown and described.

2. An oscillatory reciprocating cutter, consisting, essentially, of an oscillatory reciprocating arbor-frame and of a rotary shaft and cutter-head supported thereon, substantially as set forth.

3. In a lathe, the combination of a longitudinally-traversing carriage, a laterally-movable slide-rest on said carriage, an arbor-frame pivoted to said slide-rest and guided on arc-shaped ways of the same, a rotary cutter-shaft supported in bearings of said arbor-frame, and a cutter-head attached to the cutter-shaft, substantially as set forth.

4. In a lathe, the combination of a longitudinally-traversing carriage, a laterally-movable slide-rest on said carriage, an arbor-frame pivoted to said slide-rest and guided on arc-shaped ways of the same, a rotary cutter-shaft supported in bearings of said arbor-frame, a cutter-head attached to the cutter-shaft, and a pattern-piece supported below the work and adapted to guide the slide-rest along said pattern-piece, substantially as set forth.

5. In a lathe, the combination of a longitudinally-traversing carriage, a laterally-movable slide-rest on said carriage, an arbor-frame pivoted to said slide-rest and guided on arc-shaped ways of the same, a rotary cutter-shaft supported in bearings of the arbor-frame, a cutter-head attached to the cutter-shaft, a pattern-piece supported in centers below the work, and an anti-friction roller applied to the pivot of the arbor-frame and guided along the face of the pattern-piece, the axis of the pivot and roller being vertically in line with the point of the cutter-head, substantially as set forth.

6. In a lathe, the combination of a longitudinally-traversing carriage, a laterally-movable slide-rest on said carriage, a rack attached to said slide-rest, a treadle connected by a rope with the slide-rest, a weighted rope, also connected to the slide-rest, said ropes passing over pulleys of the carriage, and a pawl pivoted to the carriage and adapted to engage the rack and lock the slide-rest to the carriage, substantially as set forth.

In testimony that I claim the foregoing as my invention I have signed my name in presence of two subscribing witnesses.

VALENTIN MERKLEN.

Witnesses:
PAUL GOEPEL,
MARTIN PETRY.